United States Patent [19]

Ghirardello et al.

[11] Patent Number: 4,568,580

[45] Date of Patent: Feb. 4, 1986

[54] LAMINATED PACKAGING FILMS AND RELATED ARTICLES OF MANUFACTURE HAVING IMPROVED RESISTANCE TO HEAT TREATMENT

[75] Inventors: Ezio Ghirardello; Cesare Quacquarella; Paolo Colombo; Francesco Pezzana, all of Milan, Italy

[73] Assignee: W. R. Grace & Co., Cryovac Div., Duncan, S.C.

[21] Appl. No.: 533,190

[22] Filed: Sep. 19, 1983

[30] Foreign Application Priority Data

Nov. 3, 1982 [IT]   Italy ................................ 24051 A/82

[51] Int. Cl.$^4$ ............................................... B27N 5/02
[52] U.S. Cl. .................................... 428/35; 428/474.9; 428/475.8; 428/476.3; 528/324; 528/325; 528/338; 528/339; 528/340; 215/1 C
[58] Field of Search ............... 428/474.4, 475.8, 476.1, 428/476.3, 349, 35, 354, 474.9; 215/1 C; 528/324, 325, 338, 339, 340

[56] References Cited

U.S. PATENT DOCUMENTS

| | | | |
|---|---|---|---|
| 3,595,740 | 7/1971 | Gerow et al. | 428/475.8 |
| 3,635,749 | 1/1972 | Eaddy | 428/475.8 |
| 4,239,826 | 12/1980 | Knott et al. | 428/475.8 |
| 4,243,724 | 1/1981 | Strutzel | 428/474.7 |
| 4,420,516 | 12/1983 | Ermert et al. | 428/35 |

FOREIGN PATENT DOCUMENTS

| | | |
|---|---|---|
| 63006 | 10/1982 | European Pat. Off. ......... 428/476.3 |
| 2078171A | 4/1937 | United Kingdom . |
| 1319323 | 4/1973 | United Kingdom . |
| 1380918 | 1/1975 | United Kingdom . |
| 1392841 | 4/1975 | United Kingdom . |
| 1414603 | 9/1975 | United Kingdom . |
| 1518288 | 7/1978 | United Kingdom . |
| 1545096 | 5/1979 | United Kingdom . |
| 1557785 | 12/1979 | United Kingdom . |

*Primary Examiner*—Edith Buffalow
*Attorney, Agent, or Firm*—John J. Toney; William D. Lee, Jr.; Mark B. Quatt

[57] ABSTRACT

The invention relates to laminated films and articles of manufacture based on such films and having improved resistance to heat treatment, wherein said films comprise a heat sealing layer of copolyamide obtained by random copolymerization of precursor monomers of at least two different polyamides. Said laminated films, or the articles of manufacture formed therefrom, such as bags or preformed containers, are useful for packaging applications, particularly in connection with food products.

8 Claims, No Drawings

LAMINATED PACKAGING FILMS AND RELATED ARTICLES OF MANUFACTURE HAVING IMPROVED RESISTANCE TO HEAT TREATMENT

This invention relates to laminated packaging films and related articles of manufacture, such as bags, pouches, etc., particularly intended for packaging food products.

More specifically, the invention concerns films and related articles of manufacture for packaging applications, which have enhanced properties, in particular improved resistance to heat treatment, as well as improved abuse and abrasion resistance.

In the description which follows, the general term "packaging materials" refers both to films utilized as such and to bags or preformed containers manufactured from such films.

Amide homopolymers have been used for years as the components of several types of laminated packaging films, on account of their good mechanical and optical properties, and satisfactory gas barrier capabilities. On the other hand, such homopolymers have inferior heat shrinking and welding properties. For these reasons amide homopolymers have been used primarily for non-shrinkable laminated films, in combination with various types of welding layers.

A forward step in the field of amide films has been made with the commercial introduction of a new family of polyamide copolymers obtained from various species and amounts of comonomers.

However, the use of such polyamide copolymers, hereinafter termed copolyamides, in the preparation of films intended for packaging applications, is made problematical by that the gas barrier properties, which as mentioned are satisfactory in the instance of amide homopolymers, are in this case so weak that the notion of imperviousness to gas applies no longer. Thus, copolyamides, as used heretofore as backing or "structural" layers to impart strength, required the addition to the laminate of further gas barrier layers and welding layers of various description.

On the other hand, in conventional laminates, whether including a structural layer of copolyamide or not, polyolefins are generally used for welding or sealing layers which are characterized by low melting points and poor resistance to high temperatures. Thus, and especially in the instance of food products requiring such high temperature heat treatments as sterilization, pasteurization, or cooling, the treatments had to be carried out prior to packaging, with the evident disadvantage that the treated product had to undergo further handling and attendant risk of contaminating it.

Accordingly, while it has been highly desirable to have packaging films available which could withstand high temperature treatment, such that pre-packaged food products can be subjected to thermal treatment, this has been impossible heretofore with conventional films currently in use owing to the poor resistance to heat of the welding layers employed thus far.

It is a primary object of this invention to provide, in order to obviate the limitations outlined above, a packaging material, particularly intended for food product applications, which has high mechanical characteristics in combination with superior resistance to thermal treatment, even when carried out for extended periods of time and at high temperatures.

Another object of the invention is to provide a packaging film which has excellent welding properties and is highly resistant to the thermal and mechanical stresses involved in the welding process.

It is a further object of this invention to provide a packaging material which combines outstanding properties of weldability and resistance to heat treatment with desirable heat shrinking properties.

A still further object of the invention is that of providing a packaging film and/or article of manufacture having desiderably high abuse resistance in addition to the other properties mentioned above.

These and other objects, such as will be apparent hereinafter, are achieved, according to the invention, by that a heat-shrinkable multiple-layer laminated film is characterized in that it comprises, as at least one surface layer thereof, copolyamides obtained by random copolymerization of precursor monomers of at least two different polyamides, said copolyamides having melting points measured on a Perkin Elmer DSC-2 device in the 120° C. to 240° C. range.

According to another aspect of this invention, an article of manufacture is provided for packaging food products, at least a portion whereof is formed by heat welding together two sections of a laminated film according to the invention through respective ones of said copolyamide heat sealing layers, said article of manufacture being capable of withstanding, without suffering damage to said heat weld, heat treatment at temperatures in the 70° C. to 120° C. range for a period of time, varying inversely with temperature, in the range from about 10 minutes to about 15 hours.

This invention is based upon the surprising finding that copolyamides may be used in laminated films as surface layers to perform as heat welding and abuse resistant layers, and as such afford considerable advantages hitherto unattainable with conventional heat shrinkable laminate films using polyolefinic heat welding layers.

Tests carried out on various type of packages, using each time different thickness dimensions, numbers, arrangements, and compositions of the various layers, have shown that the provision of a copolyamide heat sealing layer in the laminated film affords packages which are resistant to prolonged heat treatment at high temperatures, without prejudice for the integrity of both the welds and film itself, and without the film component layers originating delamination or wrinkling.

The copolyamides useful in this invention are obtained by random copolymerization of precursor monomers of at least two different polyamides. As is known, polyamides either derives from the polymerization of a single type of monomer comprising both the chemical function which are typical of polyamides, i.e. amino and acid groups, such monomers being typically lactames, or from the polycondensation of two types of polyfunctional monomers, i.e. polyamines with polybasic acids.

In the preparation of the copolyamides for use with this invention, therefore, two different lactames may be employed, or two types of polyamines and polyacids, or a lactame on one side and a polyamine and a polyacid on the other side.

Thus, the copolyamides which are suitable for use with this invention may be prepared from monomers selected from caprolactam, lauryllactam, W-aminoundecanoic acid, adipic acid, azelaic acid, sebacic acid, undecanoic acid, terephthalicacid, dodecanoic acid, hexamethylenediamine, p-xylilenediamine, etc. Such copolyamides as are currently available commercially may be used, e.g. those known under the following trademarks: GRILON CA 6 and GRILON CR 9 (from EMS Chemie), ULTRAMID C 35 (from BASF), DURETHAN C 38 F (from Bayer), NOVAMID 2030 and NOVAMID 2020A (from Mitsubishi).

Said copolyamides will desirably have melting points in the 120° C. to 240° C. range, as measured on a Perkin Elmer DSC-2 device.

Expediently, the copolyamides acting as the heat sealing layer are employed in the inventive laminated films associated with additional layers of various character and in varying number, depending on the specific requirements which the final film is to meet in relation with its intended application.

In particular for use in films intended for packaging such food products as meat, hams, etc., the heat sealing copolyamidic layer will be associated with a backing or structural (or filler) layer capable of imparting the strength required for the application, as well as with a layer having good gas barrier properties.

The gas barrier layer may comprise any polymer conventionally utilized for that purpose, such as a copolymer of ethlene/vinyl alcohol (EVOH), polyvinylidene-chloride (PVDC), or copolymers thereof.

For the structural or backing layer, any material possessed of good strength properties may be used, e.g. olefinic polymers or copolymers.

An example of a simple structure for a film processed in accordance with this invention is the following:

copolyamide/EVOH/copolyamide

For very high temperature applications, the adherence of the gas barrier layer to the polyolefinic layers may be inadequate, in which case adhesives would be interposed between the various layers comprising the laminated film.

Examples of laminated films according to the invention which have more than three layers are the following:

| INSIDE | OUTSIDE |
| --- | --- |
| (1) Copolyamide/Adhesive/Filler/PVDC/Protective layer, or | |
| (2) Copolyamide/1st adhesive/2nd adhesive/PVDC/3rd adhesive/ Protective layer. | | wherein the inside layer is that devised to contact the food product during packaging application and to be heat sealed.

In these exemplary films, the filler and protective layers may comprise low-cost olefinic materials having good bonding properties for PVDC, e.g. a copolymer of ethylene/vinylacetate (EVA).

The adhesive layers may comprise modified olefinic copolymers, such as modified EVA like those available commercially under the trademarks PLEXAR (from CHEMPLEX), AIMER (from MITSUI), OREVAC (from ATO CHEMIE), or copolymers of ethylene/methylacrylate or ethylene/acrylic acid.

The film (2) exemplified above may be suitable for very high temperature applications, where the adherence between PVDC and the filler layers on one side, and the protective one on the other side, may be inadequate and may require the use of several adhesives.

The laminated films of this invention which comprise copolyamide heat sealing layers are especially heat resisting. In particular, that same resistance to heat is also exhibited by the weld performed by means of the heat sealing layers according to the invention, where the film is formed into a bag, pouch, etc., or utilized as such and subsequently wrapped around a product and welded thereon.

Thus, differently from conventional films which can withstand a heat shrinking treatment up to a maximum of about 96° C. for no more than 1-2 minutes, bags formed from the inventive film can withstand a pasteurization treatment at 95° C. for periods of about 1 hour, a sterilization treatment at about 120° C. for periods up to 10 minutes, and a cooking treatment in the prepackaged form at 70° C. periods up to 14 hours.

According to a further embodiment of the packaging materials of this invention, by using a copolyamide layer of appropriate thickness, in the range from 3 to 50$\mu$, films are obtained which are not only higly resistant to heat treatment but also have extremely good properties of In fact, it has been found that the copolyamide layer utilized in accordance with this invention, additionally to having excellent characteristics as the inside heat sealing layer, also shows good abuse, abrasion and puncture resistance properties.

Alternatively, for the high abuse-resistant layers, additional copolyamidic layers may be used, in particular still as outer opposite layers. In that case, the copolyamidic heat sealing layer would have a thickness dimension reduced by 3$\mu$, resistance to wear being afforded by at least one further copolyamidic outer layer having a thickness of 10$\div$100$\mu$. Of course, there could be also provided more copolyamidic layers in addition to the two mentioned above, because as explained the laminated film of this invention may be implemented in an unlimited number of variations and with a number of layers which is only limited by considerations of convenience in manufacturing and using it. By orienting the laminated films of this invention, or the individual layers composing it, and then laminating said layers, films are obtained which exhibit excellent heat shrinking properties.

The inventive laminated films are produced with conventional techniques, by extruding the layers which compose the films, and then causing them to adhere together, and/or by tubular co-extrusion thereof, and subsequent stretching and orientation, e.g. in a blown up bubble, so as to obtain a heat shrinkable film.

Articles of manufacture, for example bags can be formed from the laminate film according to the invention, using any suitable technique. For example a tubular co-extruded film according to the invention is flattened, transversely heat sealed and severed to produce end-seal bags. Bags can also be prepared which are side-seal bags, e.g. the tubular film is flattened, then slit along one side, pairs of transverse heat seals are made and the bag severed and separated between the pair of seals.

The heat shrinking of the film according to the invention has shown to be quite satisfactory, as outlined hereinabove, and capable of meeting the requirements of the packaging application for which the film is intended.

The transparence of the copolyamide layer, due to the crystalline nature of such compounds, makes the film ideally suitable for packaging products which are to remain in full view.

The examples which follow, far from being directed to restrict the inherent characteristics of this invention, will serve to illustrate some of the salient aspects of the invention.

EXAMPLE 1

Bags have been prepared by heat welding films according to the invention, which have been then tested. The structure of the bags and results of the tests are related in Table 1 on the following page.

TABLE 1

| Structure | 1<br>Ny CA6 | 2<br>Ny CA6/SU/EVA 18% | | | 3<br>Ny CA6/SU/Ny CA6 | | |
| --- | --- | --- | --- | --- | --- | --- | --- |
| Thickness | 35μ | 34μ | 19μ | 29μ | 32μ | 11μ | 25μ |
| Shrinkage | | | | | | | |
| at 80° C. % | T 39  L 36 | T 40 | | L 46 | T 39 | | L 39 |
| at 85° C. % | 40   38 | 44 | | 48 | 46 | | 46 |
| at 95° C. % | 55   50 | 49 | | 54 | 50 | | 54 |
| VPHB | | | | | | | |
| at 80° C. IOWP | 60 | 80 | | | 90 | | |
| at 85° C. IOWP | 55 | 70 | | | 84 | | |
| at 95° C. IOWP | Film breaks | 60 | | | 55 | | |
| VPHB with fat | | | | | | | |
| at 80° C. IOWP | 54 | 80 | | | 90 | | |
| at 85° C. IOWP | 52 | 70 | | | 80 | | |
| at 95° C. IOWP | Film breaks | 55 | | | 50 | | |
| Resistance to heat: | | | | | | | |
| at 70° C. × 14 h | | good | | | good | | |
| at 95° C. × 1 h | | good | | | good | | |
| at 120° C. × 10 min. | | good | | | good | | |
| Bag dimensions (mm) | 180 × 360 | 180 × 360 | | | 180 × 360 | | | where: Ny CA6 is a copolyamide produced by EMS CHEMIE: SU is Surlyn, a registered trademark of DuPont for inonmeric resins of their production; EVA is a copolymer of ethylene/vinylacetate having an 18% content by weight of vinylacetate; VPHB is a method developed by Grace for evaluating the hot strength of the weld (variable pressure hot burst). The variable pressure hot burst (VPHB) method comprises immerging in hot water a sample (e.g. a bag) on which a heat seal has been formed, injecting into the sample air under increasing pressure (measured in inches of water pressure) and measuring the pressure at which the heat seal breaks up.

The values shown relate to pressure expressed as inch $H_2O$ whereat the weld fails. By comparison, commercially currently available heat shrinkable bags reach values in the 10 to 20 range.

Column 1 of the Table illustrates the properties of a single-layer copolyamide film suitable for use with the laminated films according to this invention.

It may be seen from Table I that bags formed from films in accordance with this invention (Columns 2 and 3) have excellent heat resisting properties. Moreover, they have shown good heat shrinking and gas barring properties.

EXAMPLE 2

Wear and abrasion resistance tests carried out an experimental heat shrinkable bags, such as comprising GRILON CA6/SURLYN 1652/BB-1 to an overall thickness of 130 microns, and wherein ceramic tureens had been packaged, have shown a reject percent, as evaluated after transportation on a truck over distances equal to or exceeding 1,000 km, equal to about 50% less than the rejects resulting from the use of D-BB1 bags having the same thickness and being currently marketed by Grace.

We claim:

1. An article of manufacture for packaging food products comprising:

(a) a first film section, said section having at least one surface comprising a copolyamide obtained by random copolymerization of precursor monomers of at least two different polyamides, said copolyamide having a melting point measured on a Perkin Elmer DSC-2 device in the range from 120° C. to 240° C.;

(b) a second film section, said section being a section of a film having surface comprising a copolyamide as defined in subparagraph (a) above; and, (c) at least one heat weld between the copolyamide surfaces of said first and second sections thereby forming said articles for packaging food products, said article being capable of withstanding, without suffering damage to said heat weld, heat treatment at temperatures from 70° C. to 120° C. for at least 10 minutes.

2. The article of manufacture of claim 1 wherein said heat weld forms said film sections into a bag.

3. The article of manufacture of claim 1 wherein said first and second film sections are multi-layer films and the respective copolyamide surfaces are surface layers of the respective multi-layer films.

4. The article of manufacture of claim 3 wherein the film of said first and second sections is the same multi-layer film, said multi-layer film having a gas barrier layer selected from the group consisting of: (i) copolymers of ethylene-vinyl alcohol and (ii) copolymers of vinylidene chloride.

5. The article of manufacture of claim 4 including a food product and wherein said heat weld closes the article thus forming a bag.

6. A method of forming articles of manufacture for packaging food products comprising the steps of:

(a) providing a first film section having a surface comprising a copolyamide obtained by random copolymerization of precursor monomers of at least two different polyamides, said copolyamide having a melting point measured on a Perkin Elmer DSC-2 device in the range from 120° C. to 240° C.;

(b) providing a film section having a surface comprising a copolyamide as defined in subparagraph (a) above; and, (c) heat welding selected portions of said first and second surfaces together to form an article for packaging food products.

7. The method of claim 5 wherein the article formed is a bag.

8. The method of claim 5 where said film sections are portions of a multi-layer film each having a copolyamide surface.

* * * * *